Sept. 23, 1958 C. WALKER 2,853,102
VALVE FOR TWIN-CYLINDER DUPLICATOR
Filed Nov. 24, 1952 3 Sheets-Sheet 1
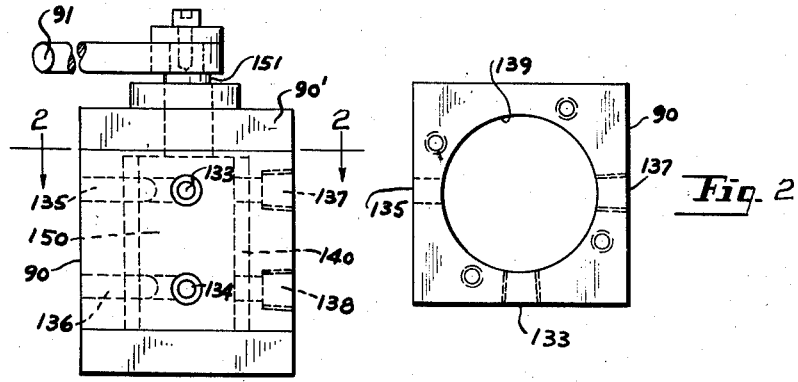
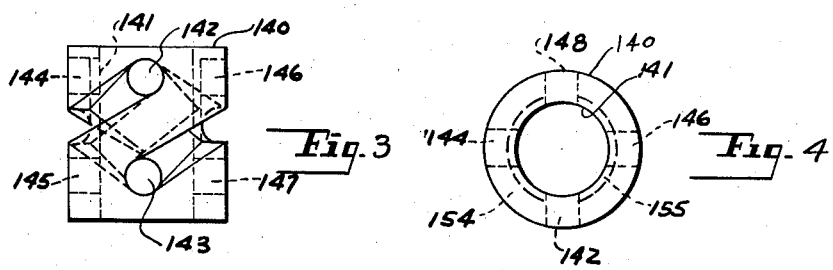
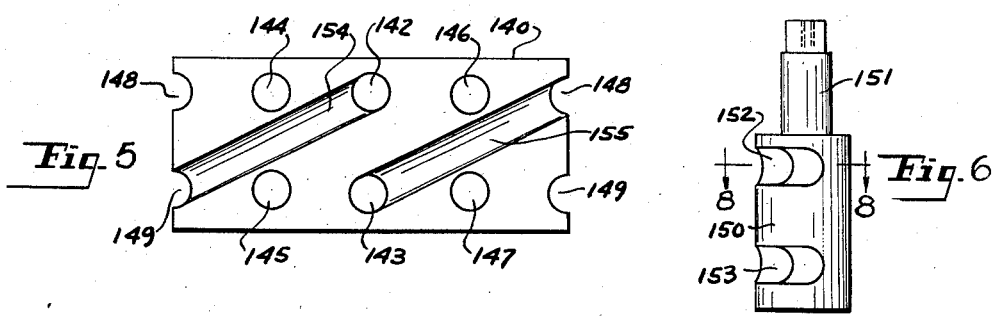
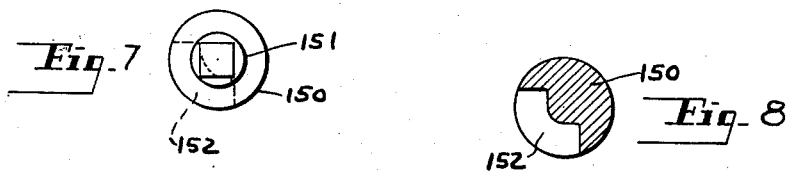
INVENTOR.
CURTIS WALKER.
BY
Robert A. Sloman
ATTORNEY.

Sept. 23, 1958  C. WALKER  2,853,102
VALVE FOR TWIN-CYLINDER DUPLICATOR
Filed Nov. 24, 1952  3 Sheets-Sheet 2

INVENTOR.
CURTIS WALKER
BY
Robert A. Sloman
ATTORNEY.

INVENTOR.
CURTIS WALKER.
BY
Robert A. Sloman
ATTORNEY.

United States Patent Office 2,853,102
Patented Sept. 23, 1958

2,853,102

VALVE FOR TWIN CYLINDER DUPLICATOR

Curtis Walker, Standish, Mich.

Application November 24, 1952, Serial No. 322,238

1 Claim. (Cl. 137—625.42)

This invention relates to a hydraulic duplicator attachment for lathes, and more particularly to a manually operated designator valve adapted for switching tracer control from one cylinder to the other of a twin cylinder operated compound for lathes.

It is the further object of the present invention to provide a designator valve adapted for connection to a pair of separately operable hydraulic cylinders for controlling the feed movements of a cutting tool in response to the co-action of a tracer to the surface of a template, whereby the tracer may be operatively connected to one cylinder or the other.

This and other objects will be seen from the following specification and claim in conjunction with the appended drawings in which:

Fig. 1 is an elevational view of the designator valve.

Fig. 2 is a section taken on line 2—2 of Fig. 1.

Fig. 3 is an elevational view of the designator valve sleeve.

Fig. 4 is a plan view thereof.

Fig. 5 is a developed elevational view of said sleeve.

Fig. 6 is an elevational view of the rotatable valve within said designator valve.

Fig. 7 is a plan view thereof.

Fig. 8 is a section taken on line 8—8 of Fig. 6.

Figure 9:
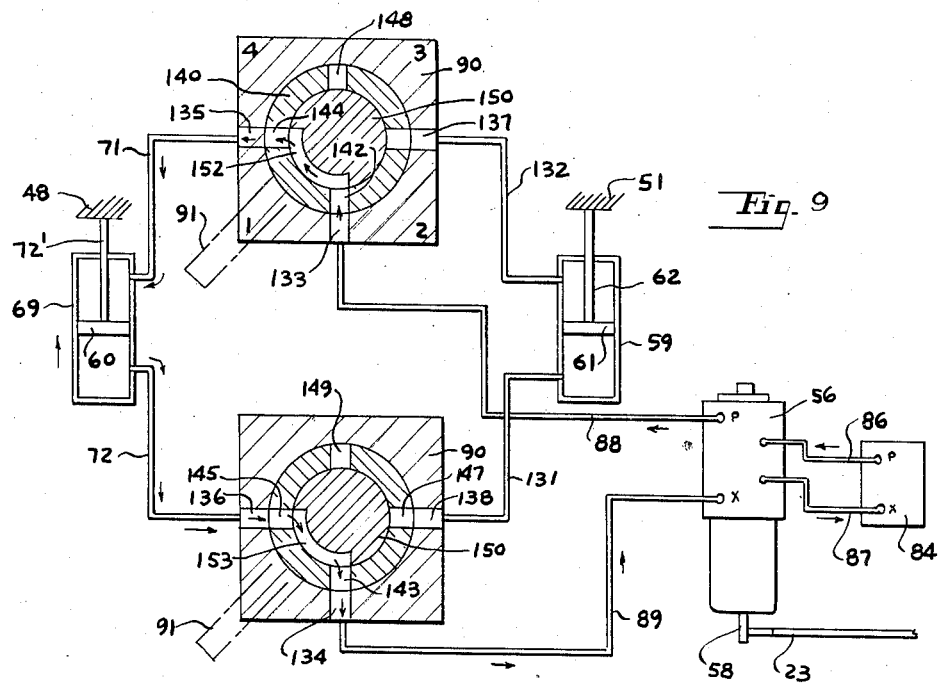
Fig. 9 is a diagrammatic view illustrating the upper and lower sections of the designator valve and their respective connections with the cylinders, the tracer and the hydraulic pressure unit, in one position of adjustment of the movable valve element within the designator valve.

It will be understood that the above drawings illustrate merely a preferred embodiment of the invention, and that other embodiments are contemplated within the scope of the claim hereafter set forth.

There is provided a designator valve 90 which directs the pressure fluid under the control of the tracer 56 to and from one or the other of the two cylinders 59 and 69 depending upon the positioning of the control arm 91.

Pressure fluid is normally supplied to the tracer 56 from hydraulic unit 84, and depending upon the positioning of the tracer valve within said tracer, this pressure fluid will be delivered outwardly of said tracer through either of its cylinder passages, these passages are respectively joined to the flexible conduits 89 and 88 at their one ends, which conduits are suitably secured at their other ends to a pair of vertically spaced ports 133 and 134 respectively in the designator valve 90, the detail of which is illustrated in Figs. 1–8.

The designator valve provides a simple manual means for determining which of the two cylinders 59 or 69 is to be under tracer control, with the cylinder not under control hydraulically locked against any movement. As shown in Fig. 9, the control arm 91, which is suitably secured to the rotary control valve element 150, Fig. 6, has four positions of angular adjustment, numbered 1, 2, 3 and 4.

With control arm in position 1 shown in Fig. 9, the left hand cylinder 69 will be under tracer control so that with a pre-determined position of the valve within the tracer, there will be an inward feed movement of cylinder 69 and the connected angular slide. By manually switching the designator valve to position 4, this same pre-determined position of the tracer valve will effect a reverse or outward feed movement of cylinder 69.

By swinging the valve arm 91 ninety degrees to position 2 of said designator valve, cylinder 69 will be hydraulically locked and the tracer will control the movements of cylinder 59. For a pre-determined position of the tracer valve, feed movement of a cylinder 59 will be inwardly and toward the workpiece. Upon the adjusting of the designator valve to position 3, this same pre-determined position of the tracer valve will effect an opposite or outward movement of the cylinder 59.

Figure 13:
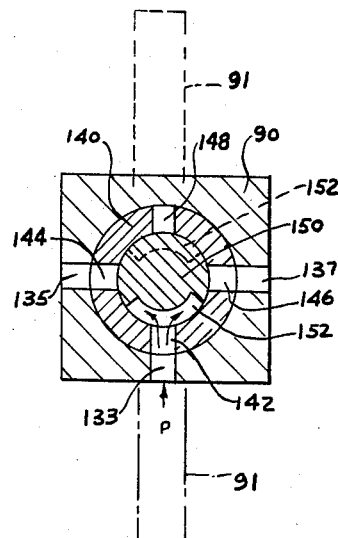
Fig. 13 is a diagrammatic view illustrating two intermediate positions of adjustment of the rotary valve element wherein the flow to both cylinders is cut off.

Fig. 13 diagrammatically designates two intermediate positions of adjustment of the control arm 91 of said designator valve whereby both hydraulic cylinders will be hydraulically locked against movement.

The designator valve 90 has secured thereto a supporting plate, which is immovably secured to cylinder 69. Furthermore, said mounting plate has a pair of passages which respectively connect at their one ends the two passages of said cylinder. The other ends of said passages are connected respectively to the two outlets 135 and 136 respectively, Fig. 1, of said designator valve.

Consequently, with valve control arm 91 in position 1 or 4, the tracer controlled pressure fluid will be delivered to and exhausted from cylinder 69 through the two cylinder passages and through the corresponding ports 135 and 136 of said designator valve.

When the control arm 91 is in either of the two positions 2 or 3, this tracer controlled fluid will be delivered to and from cylinder 59 through the separate flexible conduits 131 and 132, whose one ends respectively connect the corresponding ports of said cylinder, Fig. 9. The other ends of the conduits 131 and 132 respectively connect the two vertically spaced ports 137 and 138 of designator valve 90, the construction of which will hereafter be described.

A positive thrust on tracer contactor 58 causes pressure fluid to flow through conduit 89 to the designator valve for direction to one end of one of said cylinders, and exhaust fluid from the opposite end of said cylinder will return from the designator valve and conduit 88 back to the tracer. With the tracer valve elevated the exhaust fluid in its sleeve opening passes into a valve opening and outwardly through conduit 87 back to the hydraulic unit 84.

Upon a negative deflection of the tracer contactor its valve moves to a position below its neutral position, so that flow of pressure fluid is through conduit 88 to the designator valve entering at port 133. The exhaust flow from the opposite end of the cylinder returns to the designator valve and exhausts therefrom through port 134 and returns to the tracer through conduit 89. With its valve in negative position, this exhaust fluid passes through conduit 87 back to the hydraulic unit.

In other words, a positive deflection will deliver fluid under pressure to the designator valve through conduit 89 which connects port 134. On the other hand, a negative deflection will effect a flow of pressure fluid through conduit 88 and into port 133 of said designator valve.

Should the motor of the hydraulic unit be turned on with the contactor 58 out of contact with the template 23, the negative positioning of the tracer valve will so control the fluid connections as above described as will cause one of the cylinders 59 or 69 to be moved inwardly towards the axis of workpiece, assuming the designator valve arm 91 is in either of the positions 1 or 2 shown in Fig. 1. This inward movement of the cylinder will continue until the contactor engages the profile of the template with such pressure as will effect an upward movement of the valve back to a neutral position. This cuts off all flow of pressure fluid and the cylinder under control stops moving inwardly.

Designator valve 90, Fig. 9, is connected to cylinder 69 by the fluid passages 71 and 72. Said designator valve is similarly connected to the cylinder 59 by the flexible conduits 131 and 132, with conduit 132 interconnecting designator outlet port 137 and the cylinder inlet port 65. Conduit 131 interconnects designator fluid delivery port 138 and the cylinder port 67.

As above described, the designator valve 90 has a cylindrical bore 139 adapted to immovably receive the formed sleeve 140 illustrated in Figs. 3, 4, and 5.

Figure 11:
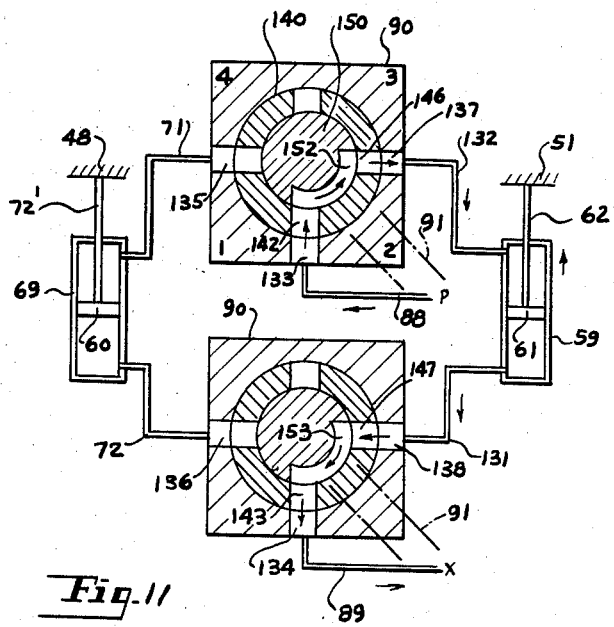
Fig. 11 is similar to Fig. 9 showing another position of the movable valve element for controlling the operation of the second hydraulic cylinder.

Designator valve housing 90 has a pair of diametrically opposed fluid delivery ports 135 and 137 constituting the upper section of the designator valve and adapted for alternate communication with the fluid inlet port 133 depending upon the position of the rotary valve 150. Said valve has the transverse slot 152 formed in its outer surface whereby as shown in Fig. 9 fluid communication is established between port 133 and port 135. Fig. 11 diagrammatically illustrates the fluid connections between the ports 133 and 137 with valve 150 and its slot 152 rotated ninety degrees from the position shown in Fig. 9.

Valve housing 90 also has a second pair of diametrically opposed fluid delivery ports 136 and 138 adapted for selective communication with the fluid delivery or exhausting port 134 by means of the transverse slot 153 in rotary valve 150. Fig. 9 illustrates port 136 communicating with port 134; whereas Fig. 11 illustrates port 138 communicating with port 133.

The cylindrical sleeve 140 has an upper section with diametrically opposed transverse passages 142 and 148 formed therein and with a second pair of diametrically opposed passages 144 and 146 arranged at ninety degrees with respect to passages 142 and 148.

Said sleeve also has a lower section which has formed therethrough and in communication with its bore 141 the diametrically opposed passages 143 and 149, as well as the second pair of ninety degree spaced diametrically opposed passages 145 and 147. The arrangement of the transverse passages within said sleeve are further illustrated in Fig. 5, which is a developed view of said sleeve.

When said sleeve is assembled within the bore 139 of the designator valve housing 90, passages 142 and 143 are in registry with ports 133 and 134 respectively. Similarly, passages 144 and 145 are in registry with ports 135 and 136 respectively. Also, passages 146 and 147 are in registry with ports 137 and 138 respectively, as furthermore illustrated in Figs. 9, 10, 11 and 12 of the drawings.

Rotatable valve element 150 with transverse longitudinally spaced passages 152 and 153 in its exterior surface, is positioned within the bore 141 of sleeve 140, and the longitudinal shaft 151 projects upwardly through the cover plate 90' and has secured at its upper end the operating handle 91.

As illustrated in the drawings and particularly Fig. 9, pressure fluid supplied to port 133 from conduit 88 passes through passage 142, slot 152, passage 144 and port 135 and through conduit 71 to the forward end of cylinder 69 for effecting inward movement thereof towards the workpiece axis when the valve within the tracer is in a negative position. The exhaust flow from the opposite end of the cylinder returns through passage 72, port 136, passage 145, slot 153, passage 143, and port 134 and through conduit 89 back to the tracer.

Figure 10:
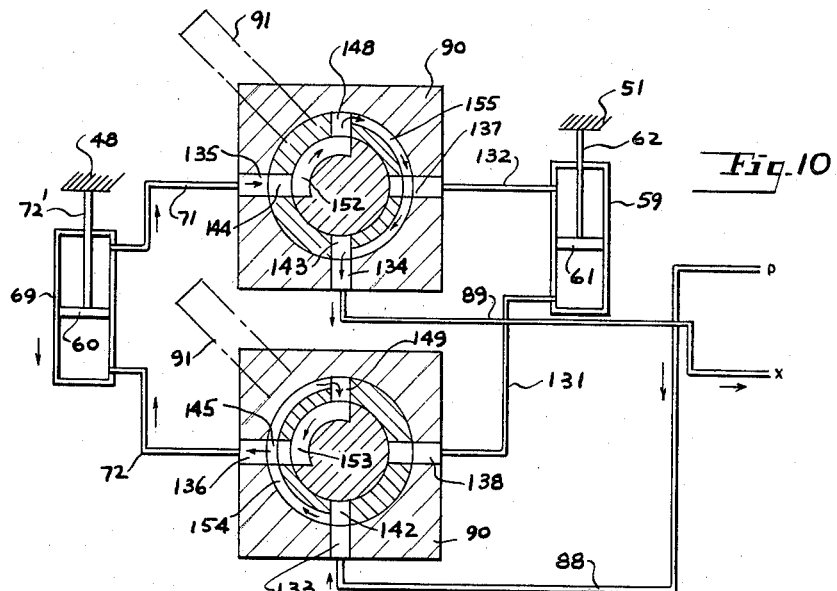
Fig. 10 is a similar view with the valve element rotated 90 degrees for reversing the connections to one of said cylinders.

Fig. 10 shows the relationship of the ports and passages when the rotary valve element 150 has been rotated clockwise 90 degrees. It will be apparent that such rotary movement effects a reversal of the direction of movement of cylinder 69 assuming also that the valve was still in the negative position.

Referring to Figs. 3 and 5, there is formed an external spiral shaped groove 154 which interconnects passages 142 and 149. Similarly, there is also formed upon the opposite side of said sleeve a second spiral shaped groove 155 which interconnects passages 143 and 148.

Referring again to Fig. 10 the pressure fluid still delivered through conduit 88 passes through port 133, groove 154, passage 149, slot 153, passage 145, port 136 and passageway 72 to the opposite end of cylinder 69. Thus, with the same negative deflection of the tracer, and with the designator valve element rotated 90 degrees, the fluid flow to the cylinder is such that the cylinder is adapted to move away from the workpiece axis. The exhaust flow from the opposite side of the cylinder will be through passageway 71, port 135, passage 144, slot 152, passage 148, passage 155, the end of passage 143 and port 134 and thence through the conduit 89 back to the tracer.

Fig. 11 diagrammatically illustrates the relationship of the ports and passages when the valve control element is rotated to position 2, which shifts tracer control to cylinder 59.

Figure 12:
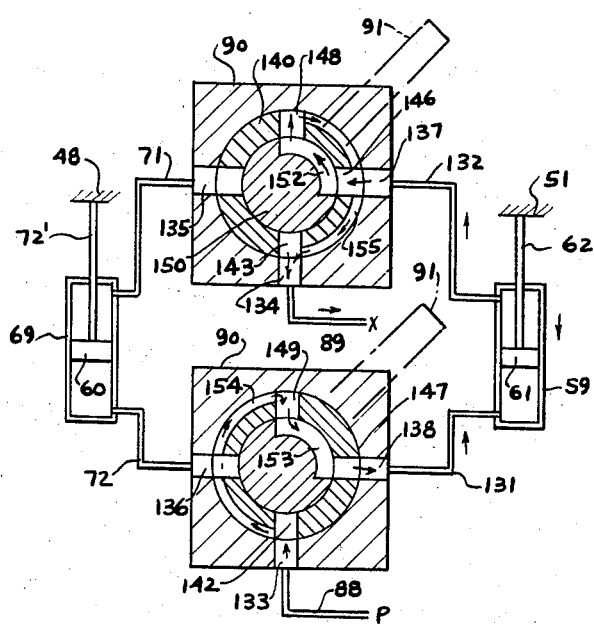
Fig. 12 is a similar view showing another position of the valve element for reversing the flow of fluid to said second cylinder.

Fig. 12 illustrates the relationship of the ports and passages when the valve element is rotated to position 3 to produce reversing action of the cylinder 59.

The present designator valve is thus constructed so as to have four positions of adjustment. In positions 1 and 4 cylinder 69 will be under tracer control; and in positions 2 and 3, cylinder 59 will be under tracer control. It is thus apparent that the designator valve may readily shift tracer control from one cylinder to the other.

The present invention contemplates the ease with which tracer control may be shifted from one cylinder to the other by the operator of the machine during a continuous carriage feeding movement for thereby reproducing in a workpiece any irregular shape in the profile of the template.

Having described my invention, reference should now be had to the claim which follows for determining the scope thereof.

I claim:

A valve comprising a casing with a cylindrical bore and having in communication with said bore, a fluid intake port and coplanar therewith a pair of diametrically opposed delivery ports at right angles to said intake port, and below said intake port in a second plane in communication with said bore a fluid exhaust port and a pair of coplanar diametrically opposed exhaust receiving ports at right angles to said exhaust port and arranged below said delivery ports respectively, a cylindrical sleeve secured within said bore having two sets of four passages, one set lying in each plane respectively, adjacent passages in each set being right angularly related, with some of the passages in one set registerable respectively with said intake port and opposed delivery ports and with some of the passages in the other set registerable respectively with said exhaust port and opposed exhaust receiving ports, there being a pair of inclined oppositely arranged spiral grooves in the outer surface of said sleeve, one groove on each side of the sleeve, with their respective ends interconnecting diametrically opposed passages in different planes in said sleeve and communicating respectively with said fluid intake and exhaust ports, said sleeve having a cylindrical bore communicating with said passages, and a cylindrical valve plug slidably rotatable within said sleeve bore and having a pair of longitudinally spaced vertically aligned 90 degree sector slots in its outer surface coplanar respectively with said two sets of passages adapted for interconnecting in each set an adjacent pair of right angularly related passages in said sleeve, one of said slots in one position of said plug interconnecting said intake port and one of said fluid delivery ports, and with said other slot adapted to interconnect said exhaust port and one of said exhaust receiving ports, said plug slots on 90 degree rotary movement in one direction being adapted to interconnect respectively said fluid intake port with the other of said delivery ports, and said fluid exhaust port with the other of said exhaust receiving ports, said plug being rotatable to other control positions 180 degrees from said first mentioned 90 degree related positions.

References Cited in the file of this patent

UNITED STATES PATENTS

| | | |
|---|---|---|
| 1,190,992 | Evans | July 11, 1916 |
| 1,384,643 | Squier | July 12, 1921 |
| 1,901,432 | Bradley | Mar. 19, 1933 |
| 2,165,096 | Frechette | July 4, 1939 |
| 2,312,941 | Tucker | Mar. 2, 1943 |
| 2,313,257 | Nelson | Mar. 9, 1943 |
| 2,326,240 | Malzahn | Aug. 10, 1943 |
| 2,389,653 | Turchan | Nov. 27, 1945 |
| 2,434,834 | Civitarese | Jan. 20, 1948 |
| 2,490,128 | Henkes | Dec. 6, 1949 |
| 2,587,542 | Siekmann | Feb. 26, 1952 |
| 2,601,345 | Turchan | June 24, 1952 |
| 2,603,117 | Turchan | July 15, 1952 |
| 2,618,244 | Roehm | Nov. 18, 1952 |
| 2,645,148 | Von Zelewsky | July 14, 1953 |
| 2,704,012 | Trinkle | Mar. 15, 1955 |
| 2,718,819 | Stephan | Sept. 27, 1955 |